F. W. MEYER.
SYSTEM OF DISTRIBUTION.
APPLICATION FILED JAN. 11, 1913.
1,235,584.
Patented Aug. 7, 1917.
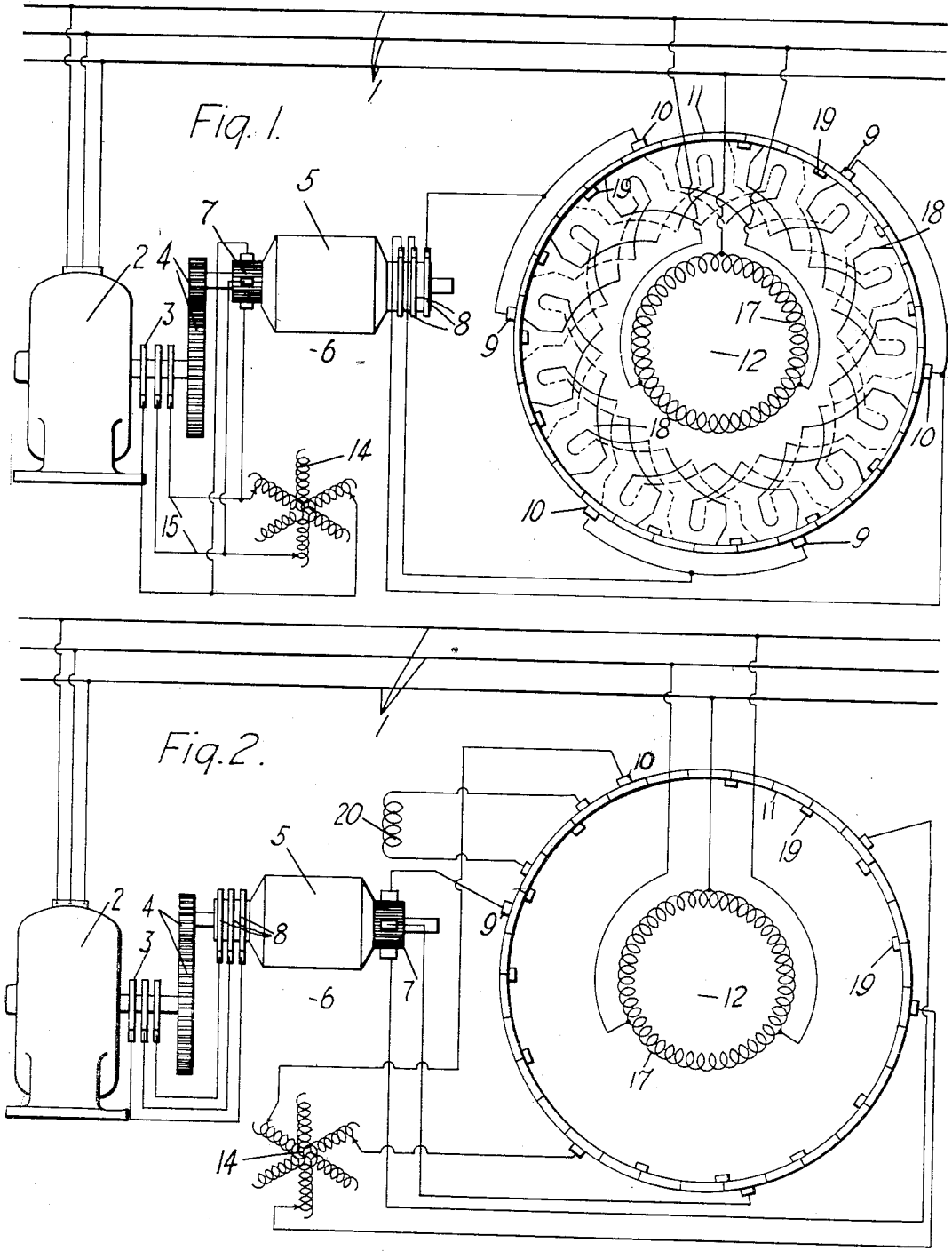

UNITED STATES PATENT OFFICE.

FRIEDRICH W. MEYER, OF WILKINSBURG, PENNSYLVANIA, ASSIGNOR TO WESTING-HOUSE ELECTRIC AND MANUFACTURING COMPANY, A CORPORATION OF PENNSYLVANIA.

SYSTEM OF DISTRIBUTION.

1,235,584.   Specification of Letters Patent.   Patented Aug. 7, 1917.

Application filed January 11, 1913. Serial No. 741,461.

*To all whom it may concern:*

Be it known that I, FRIEDRICH W. MEYER, a subject of the Emperor of Germany, and a resident of Wilkinsburg, in the county of Allegheny and State of Pennsylvania, have invented a new and useful Improvement in Systems of Distribution, of which the following is a specification.

My invention relates to systems of electrical distribution, and particularly to systems in which auxiliary commutating machines are employed in connection with induction motors for regulating and assisting them in their operation.

The object of my invention is to provide a system of the character indicated in which the speed and power factor of the induction motor and the proportion of the load carried by the auxiliary machine may be separately regulated without providing the auxiliary machine with complicated and expensive regulating windings.

In another application, Serial No. 741,459, filed of even date herewith, I have disclosed and covered a system of distribution similar to that herein set forth in which an auxiliary regulating and frequency changing machine is mechanically coupled to the induction motor, the stator winding of which machine is adapted to serve as means for transforming the voltage of the secondary member of the induction motor and as means for adjusting the power factor of the system. Because of its multiple functions, said auxiliary machine may well be termed polymorphous. In the present application, said polymorphous machine is provided with only a very simple stator winding, and the voltage transformation and regulation, and the phase or power factor adjustments are effected by means of a specially constructed voltage and phase transformer, that is interposed between the auxiliary machine and the supply circuit.

My invention is illustrated in the accompanying drawing, Figure 1 of which is a diagrammatic view of a system of distribution embodying the same, and Fig. 2 is a similar view of a modification of the system of Fig. 1.

The present system comprises a suitable polyphase supply circuit 1 which supplies current to the primary winding of an induction motor 2 that is adapted to drive any suitable load, (not shown) such as a compressor, hoist or rolling mill, the secondary member or rotor 3 of the motor being mechanically coupled in any suitable manner, such as by means of reduction gears 4, to the armature 5 of an auxiliary machine 6. The secondary winding of the induction motor is electrically connected to the armature 5 of the auxiliary machine, and this connection may be made either to the commutator 7 of the said armature, as shown in Fig. 1, or to the slip rings 8 thereof, as shown in Fig. 2.

The armature of the auxiliary machine is also connected either through the slip rings 8, as shown in Fig. 1, or through the commutator 7, as shown in Fig. 2, to three pairs of connected brushes 9 and 10 which engage a stationary commutator 11 constituting a part of a voltage and phase transforming device 12. While it is not necessary that the auxiliary machine should be provided with a stator or field winding, it is preferably provided with such a winding 14, which may be of any suitable type, such as that shown, comprising three phase divisions that are connected together at their middles or other suitable intermediate points. If desired, the stator winding may be of the type set forth in another application, Serial No. 653,380, filed by me on October 7, 1911. Current is supplied to the said winding through connections 15 extending from the commutator brushes, the points of connection to the said winding being preferably adjustable.

The voltage and phase transforming device 12 comprises primary and secondary windings 17 and 18, respectively, equally spaced points of the primary winding of which are connected to the supply circuit. The secondary winding, which, for the sake of simplicity of illustration, is here shown of the ring type but which may be of the drum type, if desired, is in the form of a lap and wave winding, alternate coils of which are opened or divided so that the two portions thereof may be respectively connected to adjacent segments of the commutator 11. The commutator 11 is also engaged by a set of brushes 19 that span all but three of alternate spaces between the commutator segments, the three spaces being equally spaced apart so as to provide three equal phase divisions of the secondary winding that are not interconnected by the said brushes.

In the operation of the system, the induction motor is started in any suitable manner, and the brushes 9, 10 and 19 of the voltage and phase transforming device 12 and the connections to the stator winding of the auxiliary machine, are regulated so as to cause the induction motor to operate at the desired speed and power factor, and to cause the auxiliary machine to carry the desired proportion of the load. For instance, if the brushes 9 and 10 are rotated while maintaining the distance between them uniform, the relative positions of the corresponding phase portions of the primary and secondary windings of the device 12 will be changed, and the power factor of the induction motor and system will be correspondingly changed. If the brushes 9 and 10 are moved toward or away from each other, the number of active convolutions of the several phase divisions of the secondary winding of the device 12 will be altered, with the result that the voltage applied to the rotors of the auxiliary machine and induction motor will be correspondingly changed, thereby effecting speed adjustment. The brushes 19 provide additional means for regulating the relative positions of the corresponding phase divisions of the primary and secondary windings of the device 12, thereby effecting phase or power factor compensation. By employing the brushes 19, the desired regulation may be effected with greater efficiency and economy of material than would otherwise be the case, since all portions of the secondary winding may then be made active.

As before stated, the stator winding 14 of the auxiliary machine may be omitted, in which case the auxiliary machine will serve only as a frequency changer to assist the device 12 in regulating the operation of the induction motor. However, if it is desired to employ the auxiliary machine as a motor for assisting the induction motor in carrying the load, it should be provided with a stator winding, and this will ordinarily be preferable, since, by operating the auxiliary machine as a motor, it may be caused to absorb all of the energy of the secondary circuit of the induction motor and convert it into mechanical energy for driving the load, so that none of it will be returned to the supply circuit through the device 12. Thus, greater efficiency in operation may be secured. When the stator winding 14 is employed, the proportion of the load carried by the auxiliary machine operating as a motor may be regulated by adjustment of the points of connection thereto of the conductors 15. However, when the stator winding is employed, it will usually be found advisable to disconnect it from the other circuits when operating in synchronism, and perhaps also when operating above synchronism, though when it is desired to obtain the maximum output from the system for operation above synchronism, or when it is otherwise desirable, it may be connected, as shown, in which case the auxiliary machine may operate either as a motor or as a generator.

The system of Fig. 2 is advantageous when the induction motor is operated at high speed, and has a limited output, since otherwise the auxiliary machine would not be economical in construction. By connecting the phase divisions of the transformer secondary winding in star relation, this system also permits of the independent regulation of the voltages applied to the stator and armature, and also of the employment of commutating or field connecting windings 20, substantially as shown.

The regulating device 12 may also be employed, but with less advantage, when the auxiliary machine and the induction motor are not mechanically coupled together.

It will, of course, be understood that many more modifications in the connections and arrangements of the various parts of the system may be made by those skilled in the art without departing from the spirit of the invention, and I desire that all such modifications be included within its scope.

I claim as my invention:

1. The combination with an induction motor, of a source of alternating current, connections from said source to the primary winding of said motor, a polymorphous dynamo-electric machine provided with adjustable field-producing means and mechanically coupled to said motor, a combined adjustable phase and voltage transformer, connections from the secondary winding of said motor through said polymorphous machine and said transformer to said source, and means for adjusting the torque transmitted through said mechanical coupling by varying the strength of the field of said polymorphous machine substantially independently of voltage and phase adjustments in said transformer.

2. The combination with an induction motor, of a source of alternating current, connections from said source to the primary winding of said motor, a polymorphous dynamo-electric machine mechanically coupled to said motor, a combined adjustable phase and voltage transformer, and connections from the secondary winding of said motor through said polymorphous machine and said transformer to said source, said polymorphous machine being provided with an adjustable field winding whereby the energy interchange between said motor and said polymorphous machine may be adjusted substantially independently of voltage and phase adjustment in said transformer.

In testimony whereof, I have hereunto subscribed my name this 31st day of December 1912.

FRIEDRICH W. MEYER.

Witnesses:
 OTTO S. SCHAIRER,
 B. B. HINES.